United States Patent
Cook et al.

(10) Patent No.: US 11,674,030 B2
(45) Date of Patent: Jun. 13, 2023

(54) HIGHLY LOADED INORGANIC FILLED AQUEOUS RESIN SYSTEMS

(71) Applicant: CORNING INCORPORATED, Corning, NY (US)

(72) Inventors: Laura Beth Cook, Corning, NY (US); Laura Jeanne Cunneen, Lawrenceville, PA (US)

(73) Assignee: CORNING INCORPORATED, Corning, NY (US)

( * ) Notice: Subject to any disclaimer, the term of this patent is extended or adjusted under 35 U.S.C. 154(b) by 294 days.

(21) Appl. No.: 16/766,850

(22) PCT Filed: Nov. 29, 2018

(86) PCT No.: PCT/US2018/063084
§ 371 (c)(1),
(2) Date: May 26, 2020

(87) PCT Pub. No.: WO2019/108808
PCT Pub. Date: Jun. 6, 2019

(65) Prior Publication Data
US 2020/0299500 A1    Sep. 24, 2020

Related U.S. Application Data

(60) Provisional application No. 62/592,088, filed on Nov. 29, 2017.

(51) Int. Cl.
*C08L 39/06* (2006.01)
*C08L 33/26* (2006.01)
(Continued)

(52) U.S. Cl.
CPC .............. *C08L 39/06* (2013.01); *C08L 33/26* (2013.01); *C08K 3/36* (2013.01); *C08K 3/40* (2013.01);
(Continued)

(58) Field of Classification Search
CPC ........... C08L 39/06; C08L 33/26; C08K 3/36; C08K 3/40; C08K 5/0025; C08K 5/09; C08K 7/14
(Continued)

(56) References Cited

U.S. PATENT DOCUMENTS 4,158,688 A   6/1979  Pett et al.
5,602,197 A   2/1997  Johnson et al.
(Continued)

FOREIGN PATENT DOCUMENTS

CN   102666073 A   9/2012
CN   103756293 A   4/2014
(Continued)

OTHER PUBLICATIONS

Chinese Patent Application No. 201880077589.1, Office Action dated Oct. 28, 2021, 5 pages English Translation, Chinese Patent Office.
(Continued)

*Primary Examiner* — Ling Siu Choi
*Assistant Examiner* — Ronald Grinsted

(57) ABSTRACT

This disclosure provides A resin system comprising (1) a resin including (i) 1-30 wt % of a binder comprising an aqueous-soluble, photopolymerizable monomer, oligomer, or polymer, (ii) 1-20 wt % of an emulsion component; and (ii) from greater than 0 to 10 wt % of a photoinitiator, and (2) 41-90 wt % of a filler including glass or glass ceramic particles wherein the particles have an average size along their longest dimension of from 5 nm to 20 μm.

27 Claims, 2 Drawing Sheets

(51) Int. Cl.
　　　*C08K 3/36*　　　(2006.01)
　　　*C08K 3/40*　　　(2006.01)
　　　*C08K 5/00*　　　(2006.01)
　　　*C08K 5/09*　　　(2006.01)
　　　*C08K 7/14*　　　(2006.01)

(52) U.S. Cl.
　　　CPC .............. *C08K 5/0025* (2013.01); *C08K 5/09* (2013.01); *C08K 7/14* (2013.01)

(58) Field of Classification Search
　　　USPC ........................................................ 524/494
　　　See application file for complete search history.

(56) References Cited

U.S. PATENT DOCUMENTS

| | | | |
|---|---|---|---|
| 6,117,612 A * | 9/2000 | Halloran | B33Y 10/00 430/269 |
| 6,899,948 B2 | 5/2005 | Zhang et al. | |
| 7,677,058 B2 | 3/2010 | Hawtof et al. | |
| 8,367,208 B2 | 2/2013 | Glaesemann et al. | |
| 8,598,055 B2 | 12/2013 | Ellison | |
| 8,763,429 B2 | 7/2014 | Danielson et al. | |
| 8,796,165 B2 | 8/2014 | Ellison et al. | |
| 9,517,967 B2 | 12/2016 | Dejneka et al. | |
| 10,562,804 B2 | 2/2020 | Cook et al. | |
| 2005/0090575 A1 | 4/2005 | Chaput et al. | |
| 2006/0160915 A1 | 7/2006 | Fuchs et al. | |
| 2009/0137771 A1 * | 5/2009 | Moriyama | A61K 6/887 528/398 |
| 2010/0022676 A1 | 1/2010 | Rogers et al. | |
| 2014/0106172 A1 | 4/2014 | Dejneka et al. | |
| 2015/0140299 A1 | 5/2015 | Ellison et al. | |
| 2015/0290610 A1 | 10/2015 | Roose et al. | |
| 2016/0346997 A1 | 12/2016 | Lewis et al. | |
| 2018/0036945 A1 | 2/2018 | Lereboullet et al. | |
| 2018/0237325 A1 | 8/2018 | Li et al. | |

FOREIGN PATENT DOCUMENTS

| | | | |
|---|---|---|---|
| CN | 105176084 | A | 12/2015 |
| CN | 105452348 | A | 3/2016 |
| DE | 10248799 | A1 | 5/2004 |
| FR | 2835827 | A1 | 8/2003 |
| JP | 2687082 | B2 | 12/1997 |
| KR | 2015077649 | A | 7/2015 |
| WO | 2000042471 | A1 | 7/2000 |
| WO | 2004/074328 | A1 | 9/2004 |
| WO | 2016/137956 | A1 | 9/2016 |

OTHER PUBLICATIONS

Chaput et al; "Fabrication of Ceramics by Stereolithography"; Ausgabe 4 (2007) 14 Pages.

International Search Report and Written Opinion of the International Searching Authority; PCT/US2018/063084; dated Jun. 24, 2019; 13 Pages; Korean Intellectual Property Office.

Klein et al; "3D Printed Glass: Surface Finish and Bulk Properties as a Function of the Printing Process"; Proceedings of SPIE—The International Society for Optical Engineering; (2015) 10 Pages.

Kotz et al; "Three-Dimensional Printing of Transparent Fused Silica Glass"; Nature, 2017 pp. 337-342.

Marchelli et al; "The Guide to Glass 3D Printing: Developments, Methods, Diagnostics, and Results"; Rapid Prototyping Journal; 17/3 (2011) pp. 187-194.

Travitzky et al; "Additive Manufacturing of Ceramic-Based Materials"; Advanced Engineering Materials, vol. 16, Issue 6, pp. 729-754. 2014.

Wozniak et al; "Highly Loaded UV Curable Nanosilica Dispersions for Rapid Prototyping Applications"; Journal of the European Ceramic Society 29 (2009) pp. 2259-2265.

Wozniak et al; "Rheology of UV Curable Colloidal Silica Dispersions for Rapid Prototyping Applications"; Journal of the European Ceramic Society; 31 (2011) pp. 2221-2229.

* cited by examiner

HIGHLY LOADED INORGANIC FILLED AQUEOUS RESIN SYSTEMS

CROSS-REFERENCE TO RELATED APPLICATIONS

This application claims the benefit of priority under 35 U.S.C. § 371 of International Application No. PCT/US2018/063084, filed on Nov. 29, 2018, which claims the benefit of priority under 35 U.S.C. § 119 of U.S. Provisional Application No. 62/592,088, filed Nov. 29, 2017, the content of each of which is incorporated herein by reference in their entirety.

FIELD OF DISCLOSURE

The disclosure relates to resin systems incorporating inorganic materials. More particularly, the disclosure relates to aqueous resin systems incorporating glasses, glass ceramics, and ceramics in high load levels. In some cases, the disclosure relates to aqueous resin systems that incorporate proprietary glasses, glass ceramics, and ceramics in high load levels.

BACKGROUND

Additive manufacturing (AM), more commonly known as three dimensional (3D) printing or rapid prototyping, refers to processes wherein layers of material are formed under computer control to create three-dimensional objects. It is a technology space that has grown into a multi-billion dollar industry that includes a myriad of processes, including extrusion deposition, light polymerization, powder bed sintering, lamination, and metal wire deposition. Such processes have been used with a variety materials, including polymers, metals, and ceramics. However, even with all this development, there continues to be a need to innovate beyond current capabilities in areas including equipment, processes, and materials.

One particular area where more additive manufacturing development is needed is in the glass space. Similar to use of AM in ceramics, the ability to create structures from glass and glass ceramic materials via 3D printing would be beneficial in that it would allow for the generation of complex structures that cannot be produced in any other way, including traditional glass shaping processes. Parts produced through additive manufacturing are often complex or have unreachable features which traditional forming processes cannot address. However, currently most AM efforts for glass are concentrated on re-melting and re-forming of glass to form 3D structures. Such structures tend to have limited resolution, which adversely affects the usefulness of the final products. The present disclosure provides a novel binder-based processes wherein the object can be 3D formed, then subsequently sintered to produce a homogenous structure that overcomes the disadvantages of earlier processes.

SUMMARY

This disclosure describes a method for multi-step processing of high resolution, laser formed inorganic structures from a powder-resin matrix via Stereolithography. Efforts similar to this processing often exclude glasses and glass ceramics, and are focused with specific metal oxides.

An aspect (1) of the disclosure provides a resin system comprising a resin including: 1-30 wt % of a binder comprising an aqueous-soluble, photopolymerizable monomer, oligomer, or polymer; 1-20 wt % of an emulsion component; and from greater than 0 to 10 wt % of a photoinitiator; and 41-90 wt % of a filler including: glass or glass ceramic particles wherein the particles have an average size along their longest dimension of from 5 nm to 20 µm. An aspect (2) of the disclosure provides the resin system of aspect (1), comprising 2-20 wt % binder. An aspect (3) of the disclosure provides the resin system of aspect (2), comprising 5-20 wt % binder. An aspect (4) of the disclosure provides the resin system of aspect (1), comprising 1-15 wt % emulsion component. An aspect (5) of the disclosure provides the resin system of aspect (1), comprising 1.5-10 wt % emulsion component. An aspect (6) of the disclosure provides the resin system of aspect (1), comprising 0.1-8 wt % photoinitiator. An aspect (7) of the disclosure provides the resin system of aspect (6), comprising 0.5-5 wt % photoinitiator. An aspect (8) of the disclosure provides the resin system of aspect (1), comprising 50-80 wt % filler. An aspect (9) of the disclosure provides the resin system of aspect (8), comprising 60-80 wt % filler.

An aspect (10) of the disclosure provides the resin system of any of aspects (1)-(9), wherein the resin further comprises 1-20 wt % dispersant. An aspect (11) of the disclosure provides the resin system of aspect (10), comprising 1-15 wt % dispersant. An aspect (12) of the disclosure provides the resin system of aspect (11), comprising 2-12 wt % dispersant. An aspect (13) of the disclosure provides the resin system of any of aspects (1)-(12), wherein the surface of the glass or glass ceramic particles have been chemically or physically modified. An aspect (14) of the disclosure provides the resin system of aspect (13), wherein the surface of the glass or glass ceramic particles have been chemically modified. An aspect (15) of the disclosure provides the resin system of aspect (14), wherein the chemical modification comprises silanation, bromination, or chlorination. An aspect (16) of the disclosure provides the resin system of aspect (13), wherein the surface of the glass or glass ceramic particles have been physically modified by thermal spheri-calization.

An aspect (17) of the disclosure provides the resin system of any of aspects (1)-(16), wherein the resin has a viscosity of from >0 to 200 Pa·s (Pascal seconds). An aspect (18) of the disclosure provides the resin system of aspect (17), wherein the resin has a viscosity of from 0.1 to 50 Pa·s. An aspect (19) of the disclosure provides the resin system of aspect (17), wherein the resin has a viscosity of from 0.1 to 20 Pa·s. An aspect (20) of the disclosure provides the resin system of any of aspects (1)-(19), wherein the resin system has a settling range of from 4-10 according to ASTM D869-859 (2015). An aspect (21) of the disclosure provides the resin system of aspect (20), wherein the resin system has a settling range of from 6-10 according to ASTM D869-859 (2015). An aspect (22) of the disclosure provides the resin system of aspect (21), wherein the resin system has a settling range of from 8-10 according to ASTM D869-859 (2015).

An aspect (23) of the disclosure provides the resin system any of aspects (1)-(22) wherein the resin system comprises an aqueous-soluble monomer comprising one or more of acrylamide/methylenebisacrylamide, poly-vinyl pyrrolidinone (PVP), or dimethylolpropionic acid (DMPA).

An aspect (24) of the disclosure provides the resin system any of aspects (1)-(23) wherein the filler comprises a glass or glass ceramic. An aspect (25) of the disclosure provides the resin system any of aspects (1)-(23) wherein the filler comprises silica, aluminosilicates, aluminoborosilicates, alkali aluminosilicates, or alkali aluminoborosilicates. An aspect (26) of the disclosure provides the resin system of any of aspects (1)-(23) wherein the filler comprises fumed silica particles having a particle size distribution (PSD) range of 5 nm to 500 nm.

An aspect (27) of the disclosure provides an article having dimensions in x, y, and z Cartesian axes comprising the resin system of any of aspects (1)-(26). An aspect (28) of the disclosure provides the article of aspect (27), wherein the article has dimensions greater than 10 mm in each of the x, y, and z Cartesian axes.

These and other aspects, advantages, and salient features will become apparent from the following detailed description, the accompanying drawings, and the appended claims.

BRIEF DESCRIPTION OF THE DRAWINGS

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

DETAILED DESCRIPTION

Figure 1:
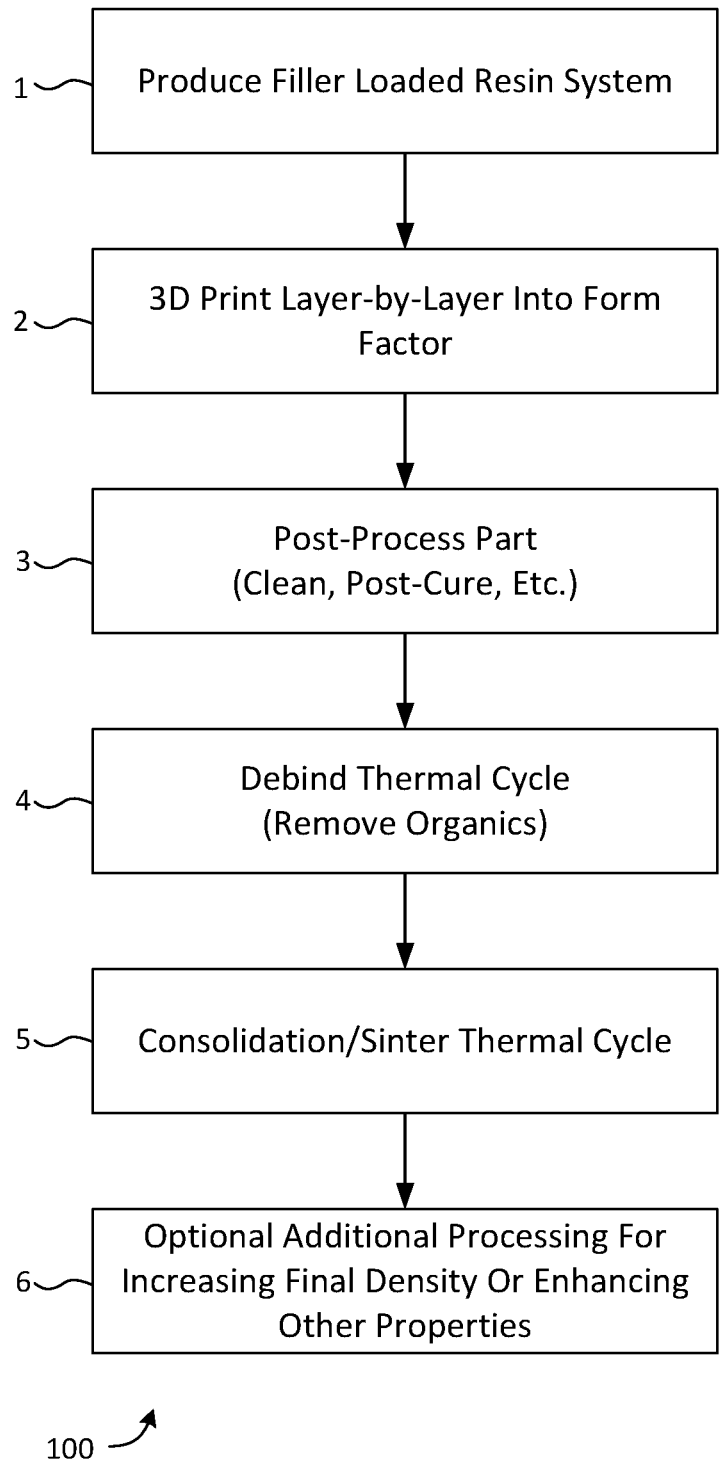
FIG. 1 is flow chart overview of some steps in an embodied 3D printing process.

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. It is noted that the terms "about," "substantially," "substantially free" and "free" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free of $Al_2O_3$" is one in which $Al_2O_3$ is not actively added or batched into the glass, but may be present in very small amounts as a contaminant (e.g., 500, 400, 300, 200, or 100 parts per million (ppm) or less or).

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

Embodied here are hybrid organic-inorganic resin systems that comprise an aqueous organic resin and inorganic filler. Note that "resin system" or "resin systems" as used herein refers to mixtures of least resin and filler and such other additives as may be used, whereas "resin" refers to resin without inorganic filler, with or without other additives. The embodied resin systems have high filler loads and can be used for additive manufacturing of inorganic materials. In particular, the resin systems can be processed into 3D shapes via stereolithography or similar processes. These green bodies can then be post-processed to remove the organics, leaving a high-density, fully-inorganic structure. The present resin system overcomes issues seen in alternative resins, such as particle settling in low viscosity solution, low particle loading, and excessive part shrinkage and stress build up in debinding, sintering, and/or other post processing or densification of the article.

One aspect of the embodiments described herein is that the aqueous resin system is readily water soluble. Typically, organic resin materials require highly volatile, hazardous organic solvents for cleaning parts post-printing. These solvents are used to cut the viscosity of the resin material or solubilize the resin such that removal is facilitated. However, the resins described herein are water soluble, eliminating expensive materials and process steps. Another aspect of the embodied resin system is that the resulting article can have unique attributes, such as high thermal stability, as well as being colored, transparent, or translucent, benefits not usually seen in additive manufacturing processes for polymers or metals.

Resin

Resin systems embodied herein generally comprise two main components a resin and a filler. The resin comprises an aqueous-soluble monomer, oligomer, and/or polymer (meaning dissolution of greater than 0.1 g per 100 mL of deionized water at standard temperature and pressure) that are curable via a reaction mechanism, such as photopolymerization or thermal treatment, free-radical polymerization, cationic or anionic polymerization, or step-growth polymization. In particular, photopolymization may advantageously be used to quickly polymize the materials in a controlled manner. Reactive species for cross linking may comprise acrylamide, methylenebisacryalmide, poly-vinyl pyrrolidinone (PVP), dimethylolpropionic acid (DMPA), aqueous epoxies, urethanes, polyurethane dispersions, polyamides, acrylates, or combinations thereof. In particular, multifunctional species improve the cross link density and therefore, improve the hardness and abrasion resistance of the cured polymer.

In addition to the aqueous-soluble monomer, oligomer, or polymer, the resin further comprises one or more emulsion components. One reason aqueous chemistries are not typically employed in resins is because evaporation of the solvent can lead to drying, which destabilizes the mixture. The resins embodied herein leverage a range of aqueous components which mitigate water evaporation by linking the water to other resin components. Emulsion components can comprise organic alcohols (octanol, isopropanol, ethylene glycol, propylene glycol, propylene glycol methyl ether acetate), fatty acids, cyclohexanes (such as Limonene), various dispersants and stearates (such as Disperbyk D110, D118) and long chain aliphatic groups such as monopalmitate. In some embodiments, the one or more emulsion components comprise between 2 and 20 wt % or between 5-10 wt % of the aqueous resin system.

In some embodiments, the resin further comprises photoinitiators (typically for reaction initiation in the blue to ultraviolet range, such as at wavelengths of 450 nm or less, for example, 410 nm or less, 405 nm or less, or at 355 nm or less). As an example, photoinitiators for the 355 nm system may include: IRGACURE® 184, IRGACURE® 500, DAROCURE® MBF, IRGACURE® 754, IRGACURE® 651, IRGACURE® 4265, IRGACURE® 819/819DW, DAROCURE® 1173, IRGACURE® 819, IRGACURE® 2022, IRGACURE® 2100, IRGACURE® 784, IRGACURE® TPO and TPO-L (Ciba Specialty Chemicals). The ones most commonly used for the 355 nm system are DAROCURE® 1173 and IRGACURE® TPO-L. The 819, 2022, TPO and 2100 listed can be used to initiate a 355-405 nm system.

Viscosity modifiers may include surfactants, diluents, and dispersants or any other component which changes the overall loaded viscosity within a workable range. Some examples include solvents (listed above), low molecular weight monomers/oligomers, dispersants (DISPERBYK® materials), surfactants (stearates, sulfonates, ethoxylates), and pH modifiers (buffers, aliphatic alcohols). Some other pH modifiers, such as ethanol amine, are stronger than aliphatic alcohols and are used for electrostatic dispersion of particles in solution. The viscosity of the formulated resin can be determined using a viscometer. For example, the procedure used to determine the viscosity of the formulated resin was done on a Brookfield® RVDV2T Viscometer. A spindle 29 with a small sample adapter was used to run samples with a spindle speed of between 0.1 and 100 RPM and then the Hershel-Buckley fit test is applied to the data for a 99+% confidence fit to get Yield stress measurements. The formulated resin, comprising all the components sans filler, should have an initial, pre-loading viscosity of from >0 to 200 Pa, 0.1 to 50 Pa, or 0.1 to 20 Pa.

Filler

The second component of the resin system is the filler. The filler comprises an inorganic material in particulate form. The inorganic material comprises a glass or glass ceramic, such as silica, aluminosilicates, aluminoborosilicates, alkali aluminosilicates, alkali aluminoborosilicates, and combinations thereof. Particle size distribution is determined by a Microtrac® Particle Analyzer. The particles can have an average size along their longest dimension of from 40 nm to 20 µm, 40 nm to 15 µm, 40 nm to 10 µm, 40 nm to 5 µm, 40 nm to 2 µm, 40 nm to 1 µm, 100 nm to 20 µm, 100 nm to 15 µm, 100 nm to 10 µm, 100 nm to 5 µm, 100 nm to 2 µm, 100 nm to 1 µm, 500 nm to 20 µm, 500 nm to 15 µm, 500 nm to 10 µm, 500 nm to 5 µm, 500 nm to 2 µm, 500 nm to 1 µm, 1 µm to 20 µm, 1 µm to 15 µm, 1 µm to 10 µm, 1 µm to 5 µm, or 1 µm to 2 µm. In some embodiments, the particles can have a $D_{50}$ along their longest dimension of from 100 nm to 8 µm, 100 nm to 200 nm, or 2 µm to 7 µm.

Examples of specific embodiments of fillers include:

1) Fumed silica particles (roughly spherical) having a particle size distribution (PSD) range of 5 nm to 500 nm. For example, a fumed silica particle blend having a particle D50 of 125 nm and having improved strength properties. In some embodiments, D-values are used to describe particle size distributions. A D-value can be thought of as a "mass division diameter." It is the diameter which, when all particles in a sample are arranged in order of ascending mass, divides the sample's mass into specified percentages. The percentage mass below the diameter of interest is the number expressed after the "D." Thus the D50 diameter of a collection of particle samples is the diameter at which 50% of a sample's mass is composed of smaller particles. The D50 is also known as "mass median diameter" as it divides the sample equally by mass. PCT/US2017/022666, herein incorporated by reference in its entirety, teaches methods of forming fumed silica particles in this range in both single and bimodal distributions via soot formation by one or more burners. The ability to form a highly loaded system with nano-materials while still maintaining a low viscosity is a novel attribute.

2) Ultra low expansion glass having a distribution similar to that of the fumed silica, but with particles in the range of 10 nm to 800 nm.

3) Pyrex®, Macor®, Lotus®, Gorilla® or Eagle XG® glasses, for example as shown in U.S. Pat. Nos. 8,367,208, 8,598,055, 8,763,429, 8,796,165, and 9,517,967 and U.S. Publ. Nos. 2014/0106172 and 2015/0140299, all of which are herein incorporated by reference in their entireties, ground to have particle distributions between 1 and 12 microns. These materials may or may not have additional colorants added.

The filler may further comprise additional components, such as ceramics, other elemental or compositional components, such as glasses or glass ceramics, as well as fillers, coloring agents, and any additional oxides or fining agents such as $SnO_2$, $ZrO_2$, ZnO, $TiO_2$, $Cl^-$ and any mixtures of the like.

Powders can possess irregular morphologies as result from grinding processes or spherical from combustion or thermal processes. Particles can be modified chemically or physically to increase loading and particle packing (via processes such as microsphere flame spray, plasma melt, solution condensation reactions). For example, physically altering particles to be spherical may be advantageous in certain situations because spherical particles have improved packing density, allowing for higher concentrations of loaded resin materials, and improved slip conditions compared to non-spherical particles, reducing the overall viscosity of the resin system.

In addition to physical modifications, the particles or can have chemical surface modifications which tailors the surface energy of the particles and can provide electronic and steric dispersion advantages (such as silanation for hydrophilic or organic compounds for intentionally hydrophobic surfaces). Some silanating materials used include 3-Glycidyloxypropyl)trimethoxysilane (GLYMO), 3-(Methacryloyloxy)propyltrimethoxysilane (TESM), Triethyloxyvinylsilane (TEVS), amine, acrylic, and glycidyl silanes which are typically trimethyoxy groups. Controlling the particle surface properties is especially critical for materials with high surface area, such as the sub-micron powders.

Resin System

Example embodiments of resin systems are given in the Table below.

|  | Embodiment 1 | | Embodiment 2 | |
| --- | --- | --- | --- | --- |
| Component | Mass (g) | Wt % | Mass (g) | Wt % |
| Mono/polymer | 4.2 | 6.6 | 8.0 | 12.4 |
| Water | 4.4 | 6.9 | 0.0 | 0 |
| Emulsifier | 3.5 | 5.5 | 1.0 | 1.5 |
| Dispersant | 2.0 | 3.2 | 7.0 | 10.8 |
| Photoinitiator | 1.0 | 0.8 | 0.35 | .5 |
| Filler/particles | 48.4 | 76.2 | 48.4 | 74.8 |
| Total | 63.5 | 100 | 64.8 | 100 |

Formed Article

As detailed below, after the resin system is formed, the resin can be printed and subsequently exposed to radiation to initiate polymerization and fix the resin in a formed state. Subsequent to such polymerization, the article can be post-processed via most traditional methods used for glasses and well known in the art, such as chemical tempering via ion exchange, chemical or physical etching, polishing, etc.

The embodiments herein can be used to produce 3D articles out of glass or glass ceramic materials that have unique properties not possible via other means, can provide cost savings and/or improved timeline compared to other machining methods, and allow for generation of high resolution articles on a SLA instrument through laser-processed materials rather than via glass extrusion or melting. In addition, while processed similar to polymer systems, the 3D printed articles can have properties much different from the resin system or polymer resin, such as high strengths and hardnesses.

Process

FIG. 1 represents in flow chart the process steps for a process 100 for forming a 3D shaped glass or glass ceramic article using the resin systems described herein.

Step 1 comprises producing or preparing the resin system and, as discussed below with respect to FIG. 2, can be broken into three steps: 1) resin formation; 2) filler formation; and 3) combining the resin and the filler.

Step 2 is the forming step. Once the resin system is ready for print, it is loaded into the resin chamber of the 3D printing equipment. Typically, the platform or print stage plate moves top-downward into the resin at <0.010" increments for each layer to be formed, desirably even at ≤0.004" or ≤0.002". Viscosity of the resin system material is such is it able to flow over the plate surface. A traversing blade may be used to further smooth the layer to a uniform surface. A YAG UV-laser is then used to selectively cure the resin. Laser parameters (developed prior) are set such that the laser power, scan speeds, and spot size are altered to tune in the desired cure energy for an initial layer thickness (<0.020") and cure accuracy (<20 microns or as needed according to the design). After the first layer is cured, the plate moves the next increment into the resin, and the other steps of the layer-by layer curing process are repeated until all layers are finished as needed to form the part. The plate then moves back to the home position above the resin surface while excess resin drains off.

In Step 3, formed parts are cleaned using various physical and chemical methods (solvents, brushes) and can be further cured in a flood cure oven for 30-45 minutes.

In Step 4, a debinding cycle is employed to remove the organic materials from the formed part, and in Step 5, a high temperature thermal cycle sinters and consolidates the part, which can achieve 95% or greater of maximum theoretical density with complete absence of organic components.

In Step 6, the debinded and sintered article can be post-processed via most traditional methods used for glasses and/or ceramics and well known in the art, such as additional thermal cycling, chemical tempering via ion exchange, chemical or physical etching, polishing, etc. Hot isostatic pressing can be useful for densification sufficient to produce good optical properties. For example, hot isostatic pressing at as high as 15000 psi in argon or at appropriate pressures in argon/oxygen 80/20 mixture has shown good results.

Figure 2:
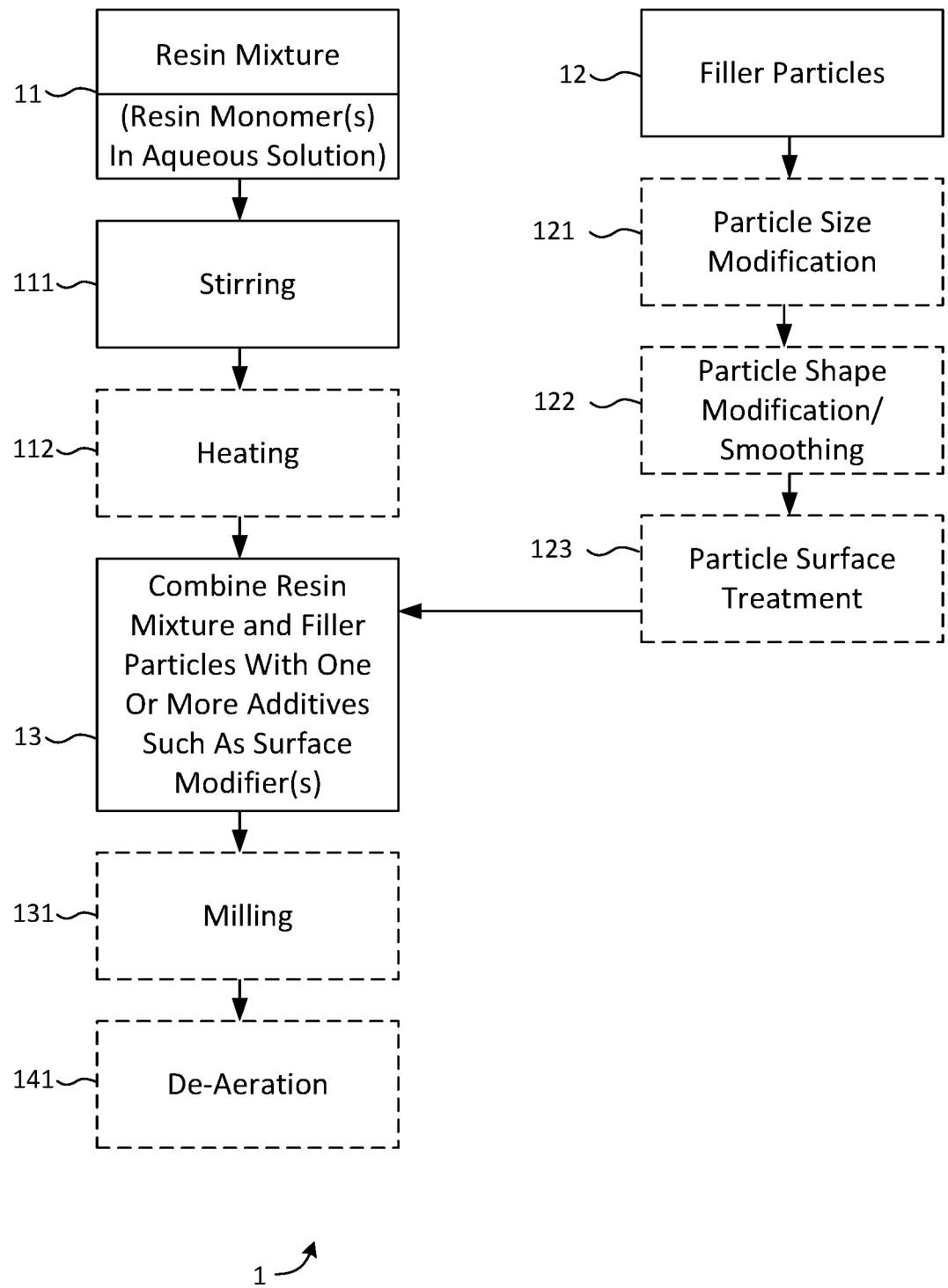
FIG. 2 is a flow chart overview of some steps in an embodied process of preparing a resin system or resin system(s) for use in 3D printing processes such as in the process of FIG. 1.

The flowchart of FIG. 2 illustrates process steps useful for step 1 of FIG. 1, producing or preparing the resin system.

Step 11 starts with a resin mixture comprising monomer(s) in an aqueous solution, which can be obtained or prepared as desired. The resin can be formed via any number of processes known in the art and described herein for forming and batching monomers into an aqueous solution. For example, the resin monomers (10-20 wt %) may be combined with water (25-50 wt %), ethylene glycol (25-50 wt %), along with any additional dispersants, emulsifiers, surfactants or viscosity modifiers, and stirred in step 111 and optionally heated in step 112, which may be simultaneous with step 112, as needed, to form an approximately homogenous solution.

Step 12 starts with Filler Particles which are glass or glass ceramic or ceramic particles (or mixtures thereof) which can be obtained or can be formed via known methods. The particles can optionally be treated via mechanical, chemical or thermal means to modify their size (step 121), shape (step 122), and/or surface properties (step 123). For example, the particles can be milled or ground, and sieved or mixed, as desired, to modify the particle size and/or the particle size distribution (step 121). As another example, flame processing can be used to modify mechanically ground particles having sharp edges into smooth spherical particles, thus modifying the shape of the particles (step 121). As a further example, the particles can (then) optionally undergo surface treatment, such as silanation, to modify the surface energy of the particles (step 123). Optional step 123 can include mixing with a surface modifier such as a silane, chlorane, acrylate, for example Pentafluorophenylacrylate (PFPMA), Pentafluorophenylacrylate (PFPA), Tetrachloroethylacrylate (TeCEA) or 2-Chloroethyl acrylate, or an acetate, for example 3-Chloro-2-oxopropyl acetate, in water or isopropyl alcohol and dried to remove solvent to form a filler composition comprising >60 wt % glass or glass ceramic and 3-15 wt % surface modifier.

Once the resin and filler are prepared, the two can be combined and thoroughly mixed using known means to produce the resin system (step 13). The final mixture can have from 5-30 wt % binder and 70-95 wt % filler (where the filler comprises >60 wt % glass or glass ceramic), along with optional photoinitiators (1-3 wt %), dispersants, and surfactants.

Additional Mixture Processing can optionally be employed, such as milling (step 131), for example, 3-roll milling or traditional milling. De-aeration (step 132) can be used (and can be necessary if sufficient entrapped gas is present) to remove entrapped gas before entering the 3D printing chamber. This is especially true for high viscosity (>10,000 cP) materials. De-aeration can be performed through planetary mixers, material rolling, or vacuum processes, for example.

EXPERIMENTAL EXAMPLES

I. Aqueous Systems

Example 1

Determining Particle Size Distribution

A Microtrac® Particle Analyzer is used to determine particle size with blue laser wavelengths used to measure down to 10 nm, red laser wavelengths used to read down to 1 micron. A solution of 4 wt % tetrasodium pyrophosphate (TSPP) is formed by mixing with water. 1-2 grams of inorganic powder comprising the particles is added to the solution and ultrasonicated in an ultrasonic bath for 5 minutes or using an ultrasonic probe for 30 seconds before run in the analyzer.

Example 2

Fumed Silica

Silanation of particles—Prior to resin incorporation, fumed silica (filler) is silanated for improved surface chemistry, which improves dispersion and suspension within the final matrix. GLYMO (3-(2,3-Epoxypropoxy)propyltrimethoxysilane), water or IPA solvents, and fumed silica are batched together into a fully mixed matrix. The matrix is dried (via thermal or dry air processes) to remove the solvent. Ultimately, the final silica can have between 8 and 30 wt % GLYMO for the surface treatment, where 10-20% is typically targeted.

Resin Incorporation—After silanation, the surface-treated silica is incorporated into the binder. An example binder contains: 30-45 wt % water, 13-15 wt % monomer (with a ratio of from 3:1 to 9:1 Acrylamide:methylenebisacrylamide), and 25-45 wt % ethylene glycol for anti-drying properties.

The full resin system may comprise: 10-20 wt % binder, 5-10 wt % 3-(2,3-Epoxypropoxy)propyltrimethoxysilane for silica sintering incorporation as a polymer derived ceramic, 0.5-1 wt % ethanol amine (pH/electrostatic dispersant), 1-2 wt % polyvinylpyrrolidone (dispersant), photoinitiator (1-3 wt %), and the remaining (~76 wt %) nano-silica (fumed). Finally, the mixture is three-roll milled to improve homogeneity and blend the mixture to an essentially clear, flowable liquid.

To test for flowability, samples were placed on a glass slide and held at 45° and 90° angles, or quantitatively measured using a rheometer to test yield stress and rheology profile. Fumed silica without surface treatment showed no true dispersion or slip condition, whereas silica functionalized with GLYMO generated a very flowable material. Viscosities of as low as ≤10 Pa·s and ≤5 Pa·s and lower were achieved, providing flowability and flow rates desirable for practical printing. These results show that surface functionalization of the filler is important to achieving desired flowability. As noted above, when the silica functionalized with GLYMO is processed through a 3-roll mill, the resulting material is visually clear.

Example 3

Glass Powders

First, an alkaline earth boro-aluminosilicate glass (Corning Lotus®) was silanated for improved surface chemistry, which improves dispersion and suspension within the final matrix. The silanation process includes the use of GLYMO (3-(2,3-epoxy propoxy)propyltrimethoxysilane) or triethoxyvinylsilane or other organic silanes, IPA, and alkaline earth boro-aluminosilicate glass powders. The matrix was dried thermally or through dry air to remove the solvent. Ultimately, the alkaline earth boroaluminosilicate powder had between 8 and 50 wt % GLYMO:glass powder for the surface treatment. At 50 wt % GLYMO, there was excess GLYMO during the silanation leaving behind a wet, shear thickening material. This formed a very stable emulsion within the resin materials when combined with water. The final mixture is 10-20 wt % mixed organic monomer solution, 3-5 wt % GLYMO, 2-5 wt % particle dispersant (solubilized in water), 75-80 wt % glass powder, and 1-3 wt % water.

While typical aspects have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A resin system comprising, as a wt % of the resin system:
 a. a resin including:
  i. 1-30 wt % of a binder comprising an aqueous-soluble, photopolymerizable monomer, oligomer, or polymer;
  ii. 1-20 wt % of an emulsion component selected from a group consisting of organic alcohols, fatty acids, cyclohexenes, long-chain aliphatics, and combinations thereof; and
  iii. from greater than 0 to 10 wt % of a photoinitiator; and
 b. 41-90 wt % of a filler including glass or glass ceramic particles wherein the particles have an average size along their longest dimension of from 5 nm to 20 μm.

2. The resin system of claim 1, comprising 2-20 wt % binder.

3. The resin system of claim 2, comprising 5-20 wt % binder.

4. The resin system of claim 1, comprising 1-15 wt % emulsion component.

5. The resin system of claim 4, comprising 1.5-10 wt % emulsion component.

6. The resin system of claim 1, comprising 0.1-8 wt % photoinitiator.

7. The resin system of claim 6, comprising 0.5-5 wt % photoinitiator.

8. The resin system of claim 1, comprising 50-80 wt % filler.

9. The resin system of claim 8, comprising 60-80 wt % filler.

10. The resin system of claim 1, wherein the resin further comprises 1-20 wt % dispersant.

11. The resin system of claim 10, comprising 1-15 wt % dispersant.

12. The resin system of claim 11, comprising 2-12 wt % dispersant.

13. The resin system of claim 1, wherein the surface of the glass or glass ceramic particles have been chemically or physically modified.

14. The resin system of claim 13, wherein the surface of the glass or glass ceramic particles have been chemically modified.

15. The resin system of claim 14, wherein the chemical modification comprises silanation, bromination, or chlorination.

16. The resin system of claim 13, wherein the surface of the glass or glass ceramic particles have been physically modified by thermal spherication.

17. The resin system of claim 1, wherein the resin system has a viscosity of from >0 to 200 Pa·s (Pascal seconds).

18. The resin system of claim 17, wherein the resin system has a viscosity of from 0.1 to 50 Pa·s.

19. The resin system of claim 17, wherein the resin system has a viscosity of from 0.1 to 20 Pa·s.

20. The resin system of claim 1, wherein the resin system has a settling range of from 4-10 according to ASTM D869-859 (2015).

21. The resin system of claim 20, wherein the resin system has a settling range of from 6-10 according to ASTM D869-859 (2015).

22. The resin system of claim 21, wherein the resin system has a settling range of from 8-10 according to ASTM D869-859 (2015).

23. The resin system of claim 1 wherein the resin comprises an aqueous-soluble monomer comprising one or more of acrylamide/methylenebisacryalmide, poly-vinyl pyrrolidinone (PVP), or dimethylolpropionic acid (DMPA).

24. The resin system of claim 1 wherein the filler comprises silica, aluminosilicates, aluminoborosilicates, alkali aluminosilicates, or alkali aluminoborosilicates.

25. The resin system of claim 1 wherein the filler comprises fumed silica particles having a particle size distribution (PSD) range of 5 nm to 500 nm.

26. An article having dimensions in x, y, and z Cartesian axes comprising the resin system of claim 1.

27. The article of claim 26, wherein the article has dimensions greater than 10 mm in each of the x, y, and z Cartesian axes.

* * * * *

UNITED STATES PATENT AND TRADEMARK OFFICE
CERTIFICATE OF CORRECTION

Page 1 of 1

PATENT NO. : 11,674,030 B2
APPLICATION NO. : 16/766850
DATED : June 13, 2023
INVENTOR(S) : Laura Beth Cook et al.

It is certified that error appears in the above-identified patent and that said Letters Patent is hereby corrected as shown below:

On the Title Page

Item (57), in Column 2, in "Abstract", Line 5, delete "photoinitiator," and insert -- photoinitiator; --.

In the Claims

In Column 12, Line 10, in Claim 23, delete "methylenebisacryalmide," and insert -- methylenebisacrylamide, --.

Signed and Sealed this
Fifth Day of December, 2023

Katherine Kelly Vidal
*Director of the United States Patent and Trademark Office*